United States Patent [19]

Klinedinst, Sr. et al.

[11] Patent Number: 5,121,913
[45] Date of Patent: Jun. 16, 1992

[54] IN-MOLD LABELING APPARATUS AND METHOD

[75] Inventors: Paul W. Klinedinst, Sr., Windsor; Philip Speranza, Dover, both of Pa.

[73] Assignee: Graham Engineering Corporation, York, Pa.

[21] Appl. No.: 689,303

[22] Filed: Apr. 22, 1991

[51] Int. Cl.⁵ .............................. B65H 3/40
[52] U.S. Cl. ..................... 271/91; 271/102; 271/107
[58] Field of Search ............ 271/4, 5, 9, 10, 11, 271/91, 102, 107; 264/509; 425/503, 504, 537, 539

[56] References Cited

U.S. PATENT DOCUMENTS

| | | | |
|---|---|---|---|
| 1,165,936 | 12/1915 | Becker . | |
| 3,941,642 | 3/1976 | Schnier | 156/297 |
| 4,639,207 | 1/1987 | Slat et al. | 271/9 X |
| 4,679,997 | 7/1987 | Plenzler et al. | 425/126 |
| 4,802,832 | 2/1989 | Shapler | 425/126 |
| 4,824,630 | 4/1989 | Mohney | 264/509 |
| 4,840,366 | 6/1989 | Johnston et al. | 271/9 |
| 5,028,229 | 7/1991 | Keyser | 271/11 X |

Primary Examiner—David H. Bollinger
Attorney, Agent, or Firm—Thomas Hooker

[57] ABSTRACT

An in-mold labeling apparatus includes a label transfer assembly having a pair of label carriage each with two label heads and two suction cups for engagement with labels from a magazine or a source of labels and placement of the labels in mold cavities of a blow molding machine. A continuously rotating drive member operates a first rotary drive to raise and lower the label transfer assembly between the label pick up and label discharge positions while dwelling the assembly at the two positions during label pick up and transfer. The drive member also operates a second rotary drive to extend and retract the dwelled label transfer heads at the two positions to pick up labels and then place the labels in mold cavities.

28 Claims, 11 Drawing Sheets

IN-MOLD LABELING APPARATUS AND METHOD

FIELD OF THE INVENTION

The invention relates to an improved in-mold labeling apparatus and method for picking up labels from label magazines or label sources and accurately and rapidly placing the labels in the mold halves of a blow molding machine. Following placement of the labels in the mold halves the mold halves close over a plastic parison and the parison is inflated within the closed cavities to form a container, conventionally a bottle. The labels are bonded to the expanded parison to form integral parts of the container.

DESCRIPTION OF THE PRIOR ART

U.S. Pat. No. 4,840,366 discloses a prior in-mold labeling apparatus and method in which a label transfer assembly is moved up and down between label pick up and label discharge positions by rotation of a fly wheel carrying a cam follower. The cam follower is fitted in a cam slot in a transverse cam member mounted on the label transport assembly. The transport assembly includes a pair of label carriages. When the assembly is at the lower or label pick up position, stops collapse the carriages to extend and retract the label transfer heads and vacuum cups for label pick up in response to the vertical movement of the assembly. Likewise, when the rotation of the drive member elevates the label transfer assembly to the upper or transfer position, stops collapse the carriages to extend the heads, vacuum cups and held labels for movement of the labels into mold cavities and transfer of labels to the mold halves. Vertical movement of the label transfer assembly and the extension and retraction of the label transfer heads are both driven through the single connection between the rotating drive member and the cam plate.

In-mold labeling apparatus are used to place labels in mold halves of blow molding machines, typically rotary blow molding machines. Increased production rates for blow molding bottles requires that the in-mold labeling apparatus must pick up and place labels in the mold halves at ever increasing rates. In the in-mold labeling apparatus, such as the apparatus disclosed in U.S. Pat. No. 4,840,366 where the head assemblies move reciprocally, increased production rates greatly increase inertial forces on moving parts, and cause vibration and undesired stressing in the entire machine. The vibration and stresses extended from the in-mold labeling apparatus down through the drive connection to the common drive motor used to power the apparatus and also the blow molding machine.

The unwanted forces occur because of the large loading forces required to rapidly accelerate and decelerate the relatively large members of the in-mold labeling machine up and down between the labeling pick up positions and because of the large forces required to rapidly accelerate and decelerate the label transfer heads as they are moved in and out during label pick u and label transfer. Wear is experienced at the cam plate where the drive member transmits the needed forces necessary to both reciprocate the label transfer assembly between the pick up and labeling positions and extend and retract the label transfer heads.

SUMMARY OF THE INVENTION

In the in-mold labeling apparatus of the present invention, the loading forces are reduced by providing separate drives connected to a rotating wheel for independently moving the label transfer assembly up and down and independently extending and retracting the label transfer heads. Separate drives reduce transmitted forces and wear. Further, the maximum forces transmitted through the drives are timed to occur at different intervals during the cycle of operation thereby spreading the forces in time and reducing stress on the drive system.

The use of a separate drive for extending and retracting label transfer heads reduces the amount of mass moved during this operation with a commensurate reduction in forces experienced along the drive train.

Other objects and features of the invention will become apparent as the description proceeds, especially when taken in conjunction with the accompanying drawings illustrating the invention, of which there are 11 sheets and one embodiment.

DESCRIPTION OF THE PREFERRED EMBODIMENT

Figure 1:
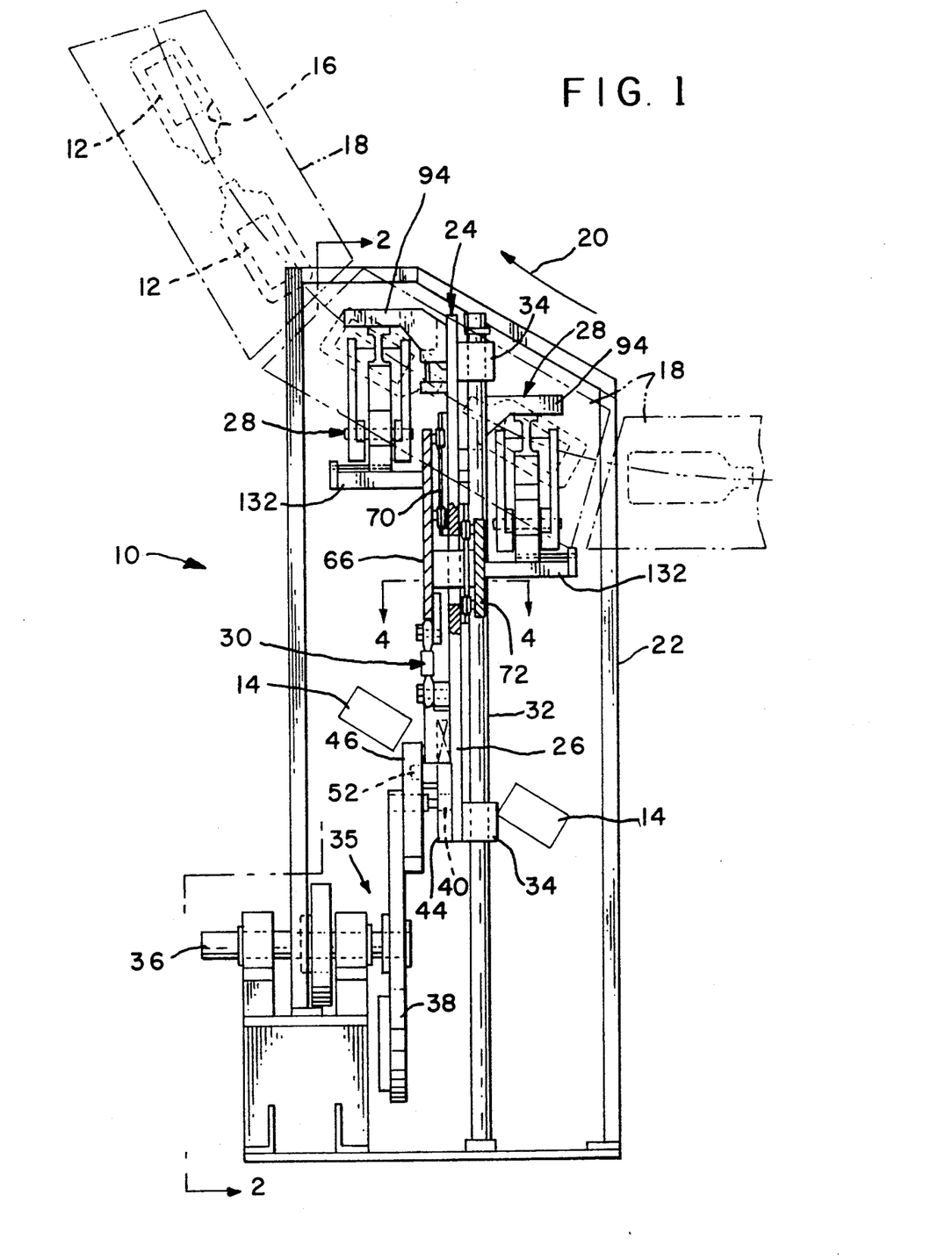
FIG. 1 is a side view of an in-mold labeling apparatus according to the invention.
Figure 2:
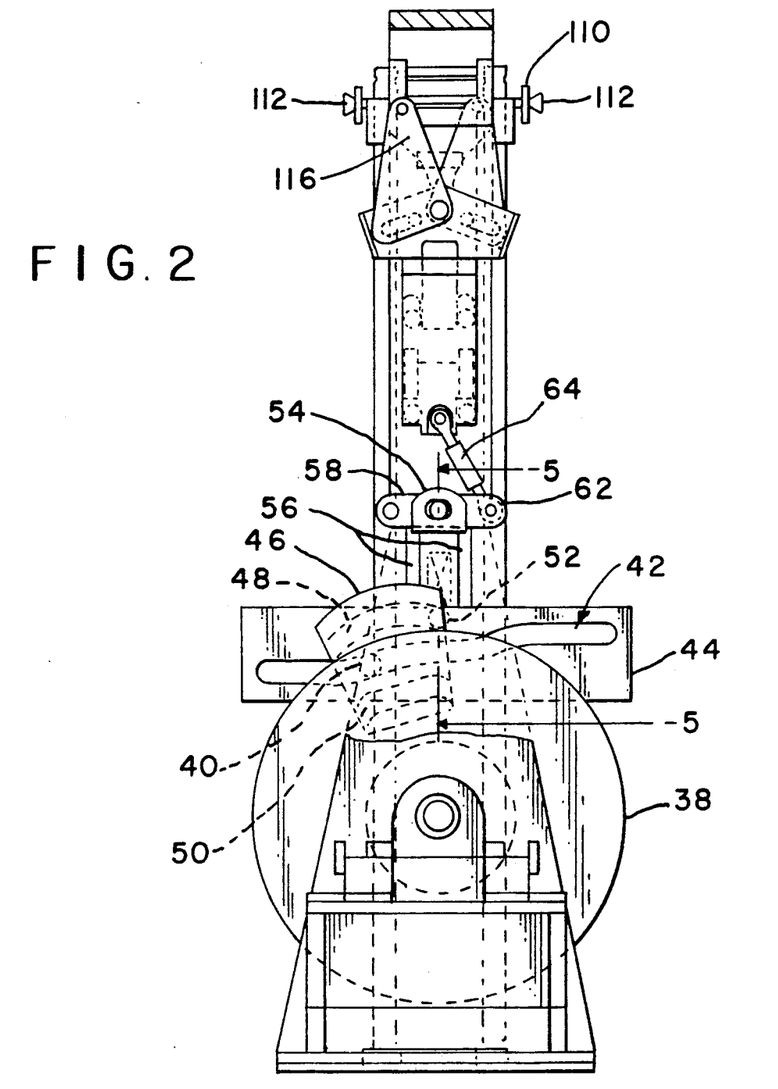
FIG. 2 is a view taken generally along line 2—2 of FIG. 1.
Figure 10:
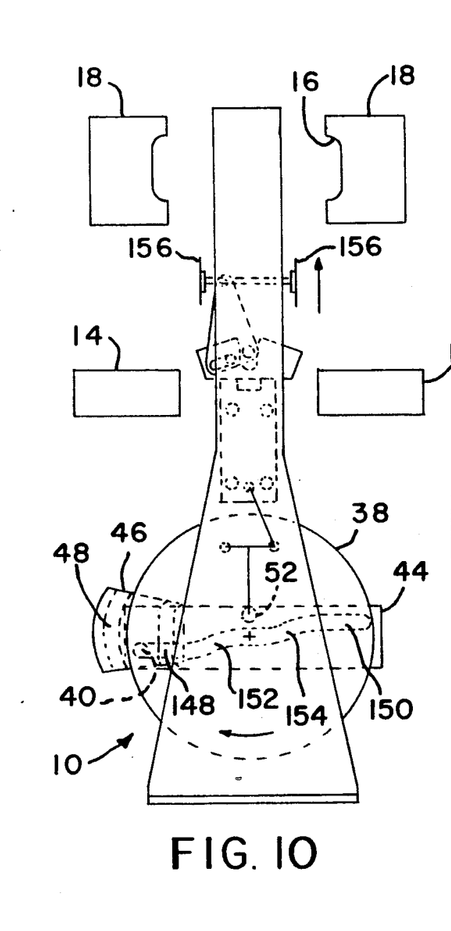
FIGS. 10-19 are representative views similar to FIG. 1 illustrating the cycle of operation of the in-mold labeling apparatus.

In-mold labeling apparatus 10 picks up four labels 12 from magazines or label sources 14 and simultaneously deposits the labels in recesses 16 of opposed mold halves 18 of a continuously rotating blow molding machine (not illustrated). As illustrated in FIGS. 1 and 10, the blow molding machine includes a number of paired mold halves 18 spaced around a large diameter circle and rotates these mold halves continuously in the direction of arrow 20 of FIG. 1. Each mold defines two blow molding cavities when closed. All four recesses in the two cavities are labeled during a single cycle of operation of apparatus 10.

The in-mold labeling apparatus includes a support frame 22 shown in FIG. 1. The frame extends upwardly and between the open mold halves 18 as they are rotated by the molding machine between the ejection and extrusion stations. Two label magazines or label sources 14 are mounted on each side of the frame 22 in staggered positions as shown in FIG. 1. Label transport assembly 24 is movably mounted on the frame between the magazines or label sources 14 and includes a mounting plate 26, a pair of like label carriages 28 on opposite sides at the upper end of the plate and a carriage drive assembly 30 mounted on the left hand side of the plate as shown in FIG. 1. A pair of spaced, parallel support rods 32 extend vertically between the upper and lower ends of the frame. Slide bearings 34 mounted on the upper and lower ends of plate 26 are fitted on the rods to permit vertical reciprocal motion of the label transport assembly 24 along a straight path between a label pickup position at the magazines and the labeling position at the mold halves.

The transport assembly 24 is moved up and down along the rods between the label pickup and labeling positions by a rotary drive 35 including a rotary drive shaft 36 mounted in bearings on the bottom of the frame 22 and carrying a counter-balanced drive wheel located to one side of the mounting plate 26. A rotary drive member 40, mounted on the circumference of wheel 38, is fitted within cam slot 42 of transverse cam plate 44. Plate 44 is mounted on the bottom of plate 26. Shaft 36 is continuously rotated by the drive motor of the blow molding machine through a suitable drive (not illustrated) and drives member 40 around a repetitive circular path so that the member is moved back and forth along slot 42 and raises and lowers the assembly 24 between the pick up and labeling positions.

The carriage drive assembly 30 includes a two slot cam plate 46 mounted on the outer circumference of wheel 38 adjacent to drive member 40. The plate has a pair of cam slots 48 and 50 each facing plate 26 with slot 48 located radially outwardly of slot 50 with respect to the axis of shaft 36. During the cycle of operation of apparatus 10 rotation of the shaft 36 moves the slots 48 and 50 into engagement with cam follower 52 to extend and retract the label transfer heads in the label carriages 28 when the carriages are at the label pick up and labeling positions, respectively.

Slot 48 is located radially outwardly of slot 50, is rotated in a circumferential path and has a curvature greater than that of the circumferential path so that movement of cam follower 52 through the slot moves the follower upwardly. This movement occurs when the plate 46 is at the top of the wheel 38.

Radial inward slot 50 is rotated in a circumferential path with the wheel and has a curvature less than that of the circumferential path so that when the plate 46 is at the bottom of the wheel and engages cam follower 52, the cam follower is moved vertically upwardly.

Follower 52 is secured to the bottom of a vertical slide member 54 which in turn is confined between guides 56 mounted on the bottom of plate 26 to permit vertical movement of the member relative to the plate in response to movement of the follower 52 through slots 48 and 50. Pivot arm 58 is rotatably connected to plate 26 at end 60. The free end 62 of the arm is pivotedly connected on an adjustable link 64 which is in turn connected to a vertical plate 66 through an adjustable connection 68 shown in FIG. 8. Plate 66 is mounted for limited vertical movement on plate 26 by a V-wheel and guide connection 70 shown partially in FIGS. 1 and 9.

Figures 3, 4:
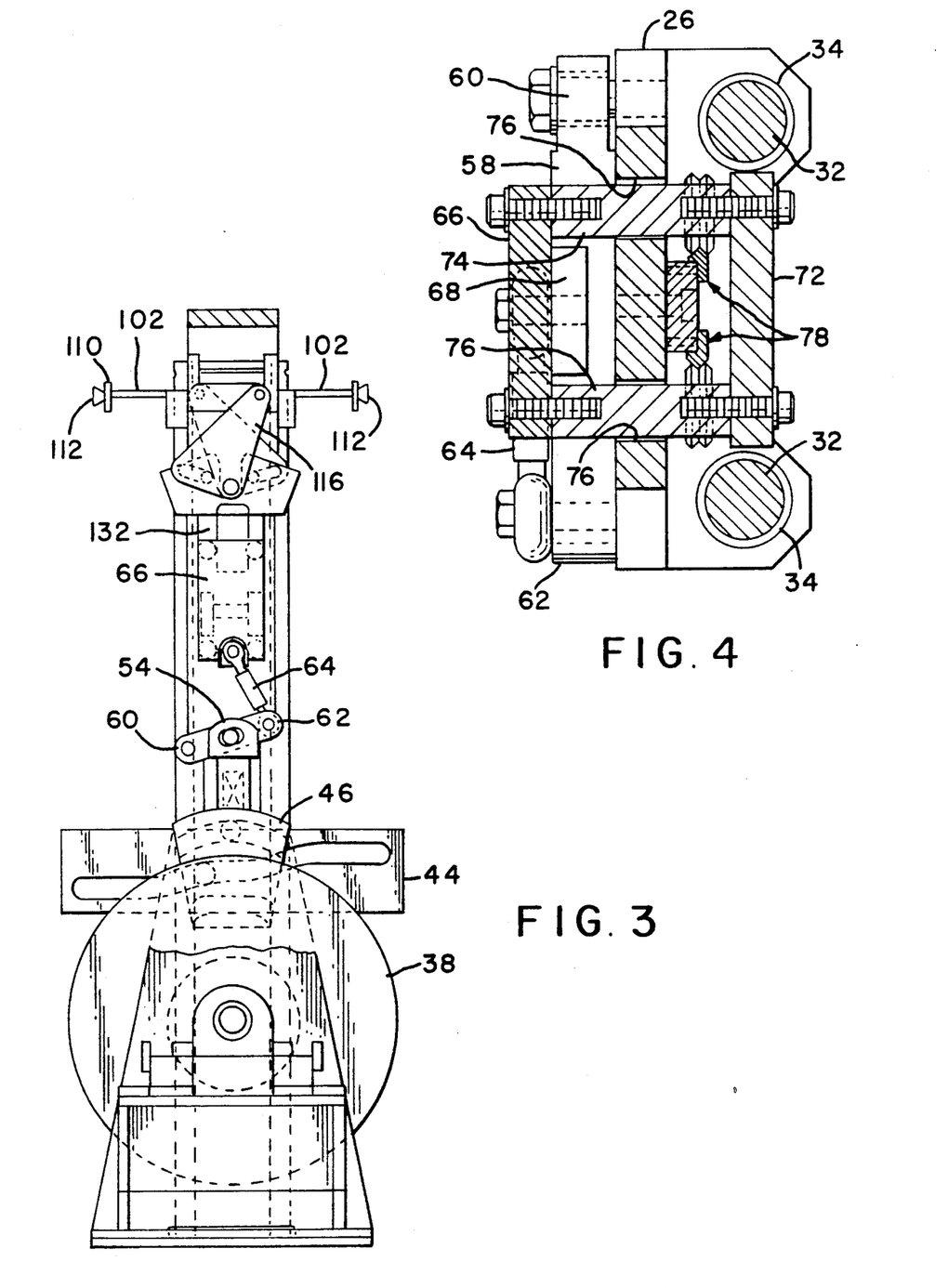
FIG. 3 is a view like FIG. 2 but showing the machine in a different position.
FIG. 4 is a sectional view taken along line 4—4 of FIG. 1.

Plate 72, similar to plate 66, is located on the side of plate 26 away from plate 66 and is connected to plate 66 by a pair of spacer blocks 74 extending through slots 76 formed in plate 26. Plate 72 is mounted for vertical movement relative to plate 2 by V-wheel and guide connections 78 shown in FIGS. 4 and 9. Connections 78 are similar to connections 70 so that plates 66 and 72 are moved together vertically with respect to plate 26.

Roller 80 on the center of pivot arm 58 and extends into an enlarged recess 82 formed in the upper end of vertical slide member 54. Vertical movement of the slide member 54 rotates pivot arm 58 up and down to move plates 66 and 72 vertically with respect to plate 26.

Figure 5:
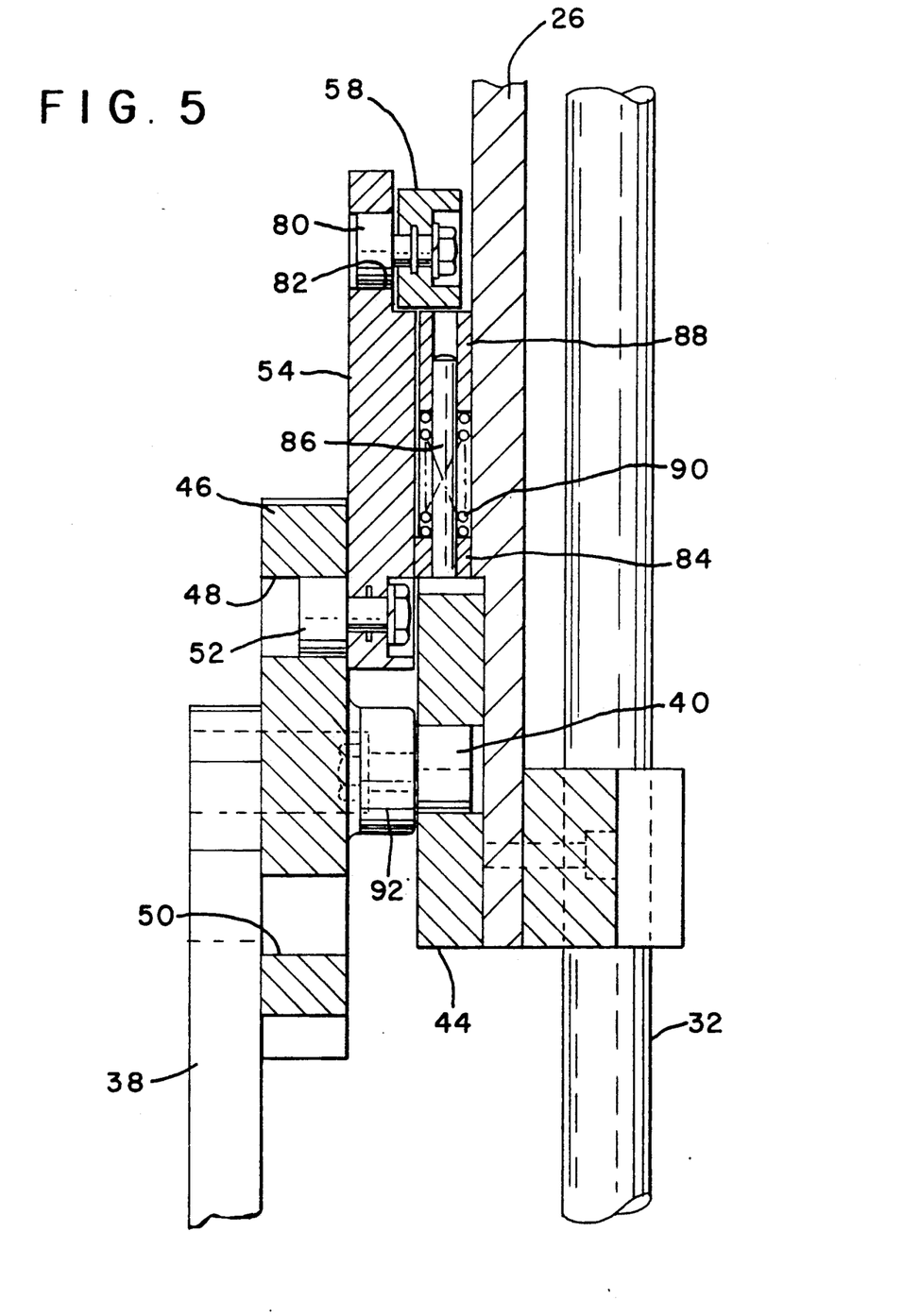
FIG. 5 is a sectional view taken along line 5—5 of FIG. 2.

As shown in FIG. 5, block 84 is mounted on the side of slide member 54 away from cam plate 46 and supports a vertical pin 86 that extends up into a bore in block 88 mounted on plate 26. Spring 90 surrounds the pin 86 and is confined between the blocks 84 and 88. The spring biases slide 54 downward toward the lower position relative to block 88 to locate the cam follower 52 in proper position for movement into cam slots 48 and 50 as the plate 46 is rotated around shaft 36. Drive member 40 is mounted on a boss 92 integral with plate 46. The boss has a height approximately equal to the thickness of slide member 54.

Figure 6:
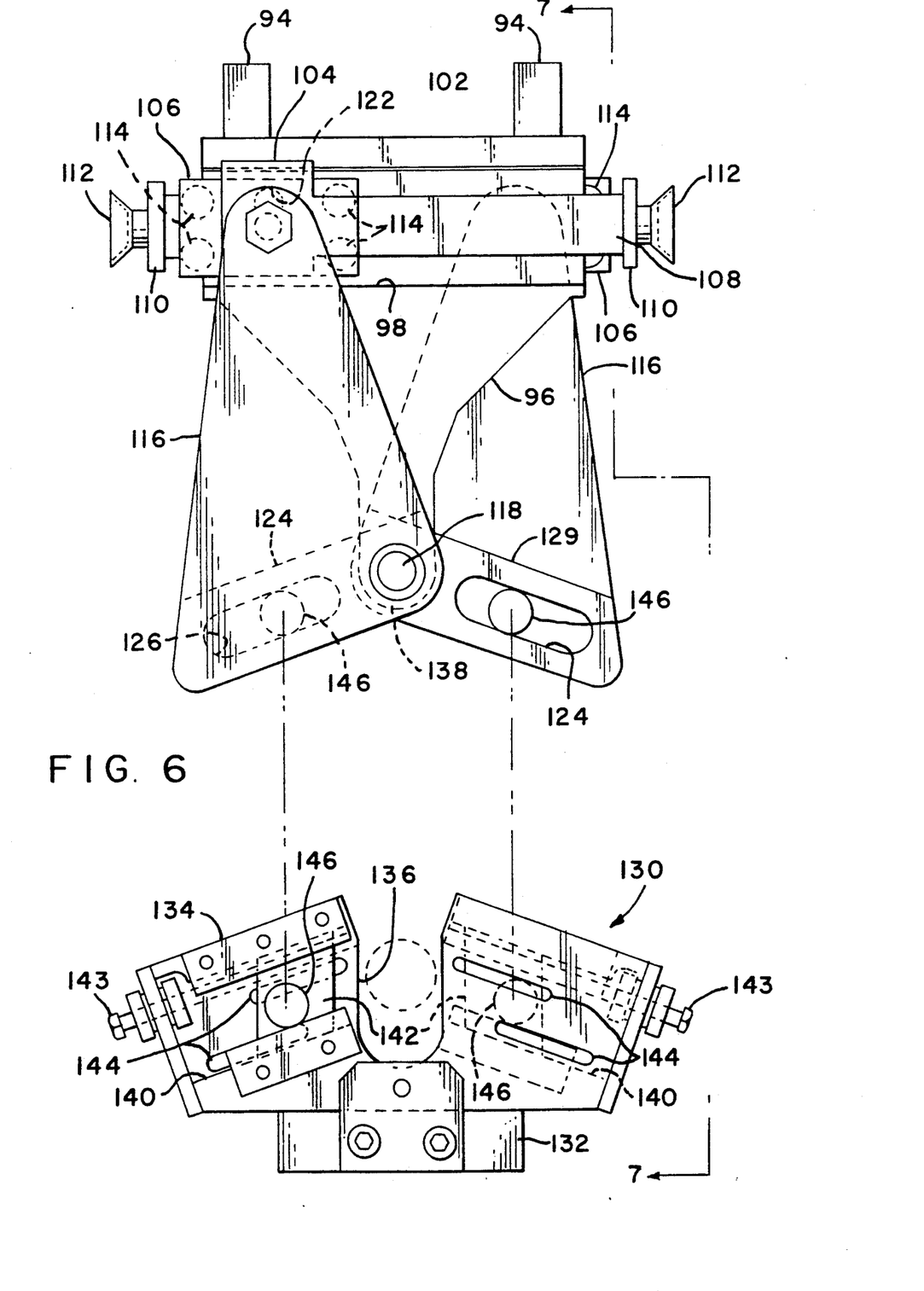
FIG. 6 is an exploded view of a portion of one label transport carriage located at the top of the in-mold apparatus 10.
Figure 7:
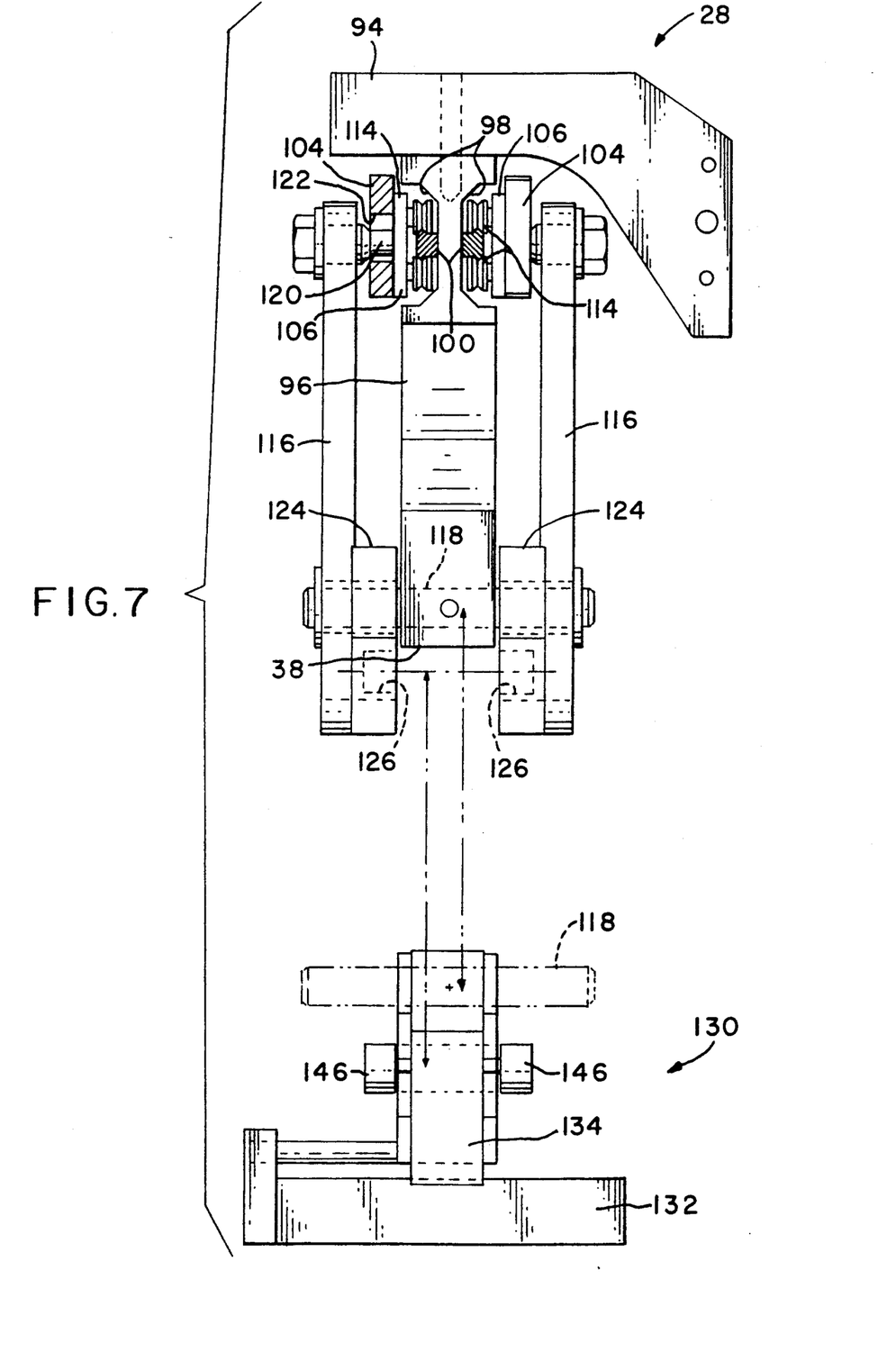
FIG. 7 is a view taken along line 7—7 of FIG. 6.

Label carriages 28 are shown in exploded view in FIGS. 6 and 7. The carriages are identical with the exception that each carriage extends from an opposite side of the mounting plate 26 and is actuated by movement of the adjacent vertical plate 66, 72 located on the same side of the mounting plate. Accordingly, only one of the label carriages will be described in detail with the understanding that the description applies to both of the carriages.

Each carriage includes a pair of spaced upper support arms 94 mounted on the upper portion of plate 26 and extending away from the plate. A vertical support member 96 is mounted on and extends downwardly from arms 94 parallel to plate 26. A pair of recesses 98 are provided in the upper sides of support member 96 facing toward and away from the plate 26 as shown in FIG. 7. Horizontally extending double-V tracks 100 are mounted in the bottom of the recesses 98. The parallel tracks extend toward the mold recesses 16 when the label carriages are in the labeling position and toward the magazines or label sources 14 when the carriages are in the pick up positions.

Each label carrier 28 includes a pair of arms 102 and a drive for moving the arms between extended and retracted positions. The arms have inner ends 104 mounted on rectangular carriage plates 106 and outer ends 108 extending beyond the sides of the support member 96. Four V-wheels 114 are mounted on each carriage plate and engage the V tracks 100 to permit extension and retraction of the arms 102 along the tracks. Offset label transfer heads 110 are mounted on arm ends 108 and extend to the center line of the assemblies. Vacuum cups 112 are mounted on the heads 110 at the center of the assembly and in proper position for label pick up and transfer.

The arms 102 and vacuum cups 112 are extended and retracted by rotation of triangular shaped extension arms 116 located on each side of the assembly and each associated with one of the arms 102. As shown in FIGS. 6 and 7, each arm 116 is rotatably mounted on a pin 118 extending through the lower end of the support member 96. The upper ends of the arms 116 each carry a roller drive member 120 fitted within a vertical slot 122 in the inner arm end 104. Cam follower plates 124 are secured to the lower edges of arms 116 and face inwardly toward the center of the carriage. Grooves 126 are formed on the inner edges of the plates 124 and extend toward the axis of pin 118. As shown in FIG. 7, the blocks extend across the full width of the arms 116 and surround the ends of pin 118.

Carriage drive assembly 30 extends and retracts arms 102 as drive unit 130 shown in the bottom of FIGS. 6 and 7 is raised and lowered relative to the label carriage 28. Each unit 130 is mounted on a support plate 132 mounted on the respective vertical plate 66 or 72 under the label carriage. See FIG. 1. A support block 134 is secured to the plate 132 and includes a U-shaped recess 136 opening at the top of the block. The lower end 138 of the support member 96 is fitted within the recess 136 with grooves 126 in the arms 116 facing adjacent slots 140 in the support block 134. Blocks 142 are adjustably positioned in slots 140 by means of screws 143 to vary the positions of the blocks along the slots and thereby adjust the length of the extension and retraction stroke of arms 102. Slots 144 are provided on the bottoms of the slots 140 to permit screws to be threaded into the blocks to secure the blocks in desired positions within slots 140. Each block 142 supports a cam follower 146 which extends from the block and into the slot 126 of adjacent arm 116.

Vertical movement of support plates 134 raise and lower the drive units 130 relative to the fixed support member 96 so that the cam follower 146 is raised and lowered thereby rotating the arms 116 to extend and retract the arms 102. The stroke of arms 102 is adjusted by adjusting the position of blocks 142 in slots 140. Movement of the blocks outwardly away from pin 118 decreases the stroke of arms 102 while positioning of the blocks 142 closer to the pin 118 increases the stroke of the arms 102.

Figure 8:
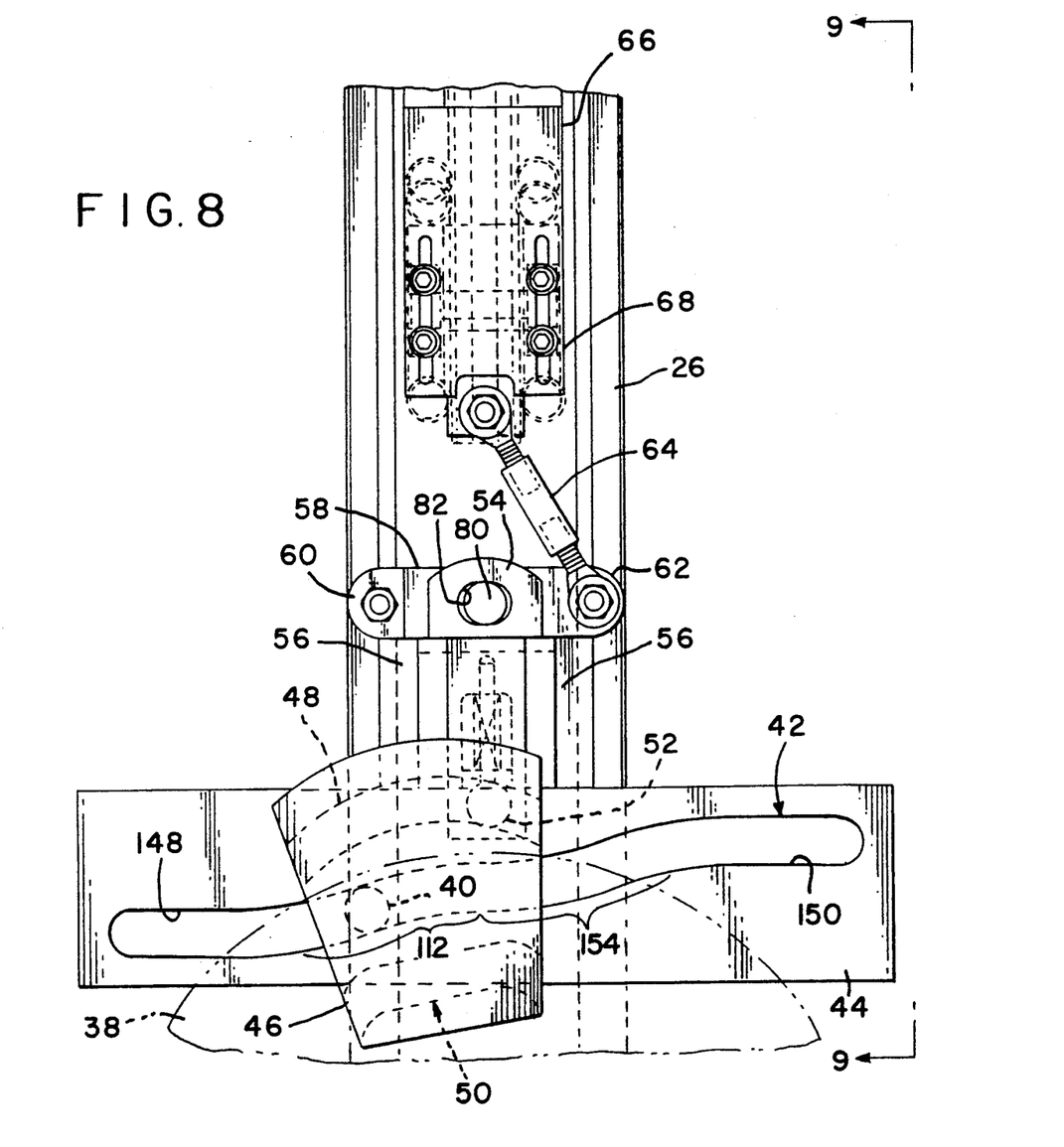
FIG. 8 is an enlarged view of a portion of FIG. 2.
Figure 9:
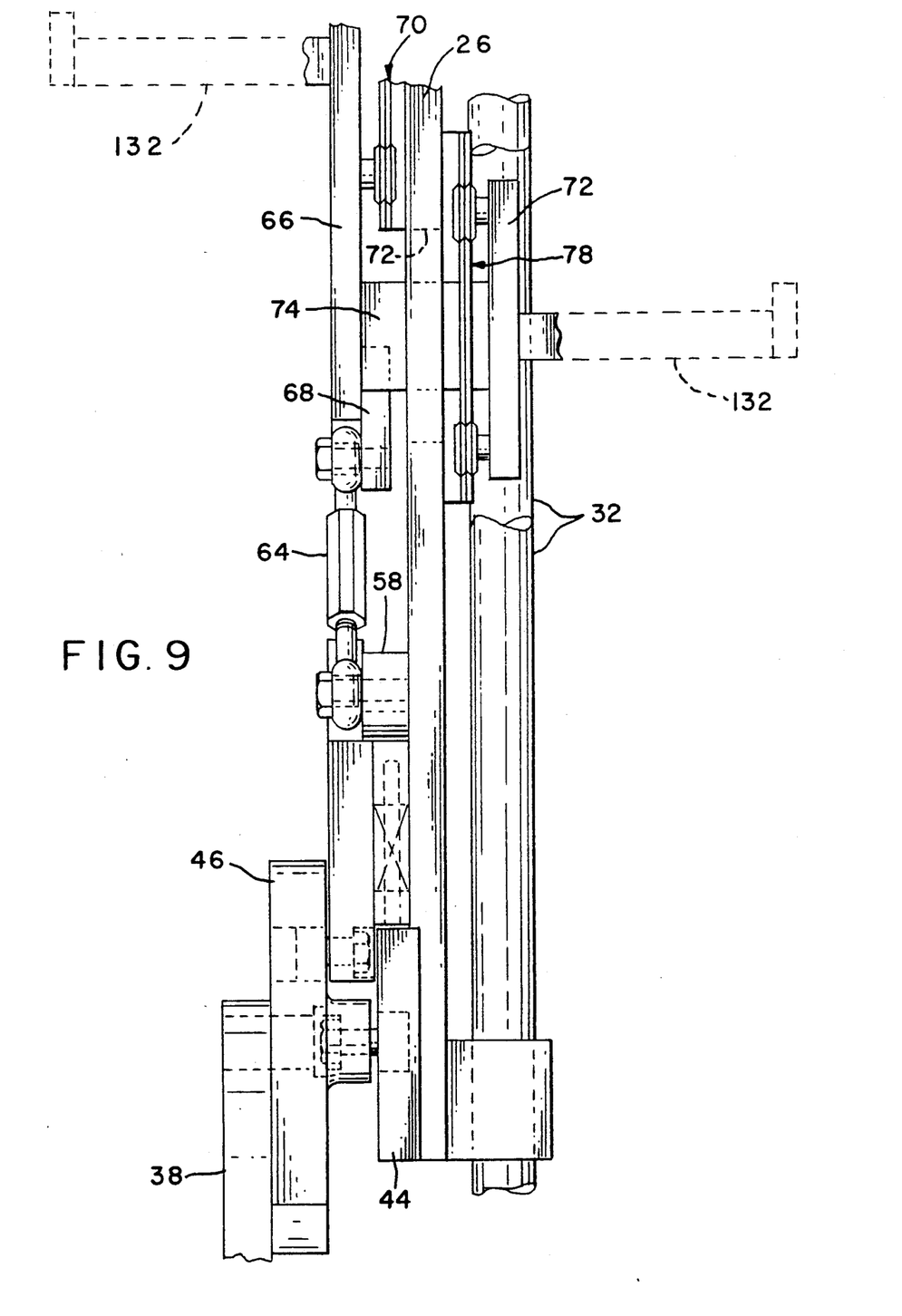
FIG. 9 is a view taken along line 9—9 of FIG. 8.

As shown in FIG. 8 cam slot 42 in plate 44 includes straight end sections 148 and 150 each extending perpendicular to the direction of movement of the label transport assembly 24 along rods 32. Section 148 is located on the left side of the cam slot and section 150 is located on the right side of the cam slot with section 150 at a level above section 148. The sections 148 and 150 are joined by a shallow S-shaped portion of the cam slot including an upwardly curved section 152 extending from section 148 to the center of the slot and a downwardly curved section 154 extending from the end of slot 150 to the center of the slot. All four sections are smoothly joined to facilitate movement of the drive member 40 back and forth along the slot as wheel 38 is continuously rotated by the drive mechanism for the blow molding machine. Member 40 has a rotational diameter slightly less than the width of the slot 42.

Figure 17:
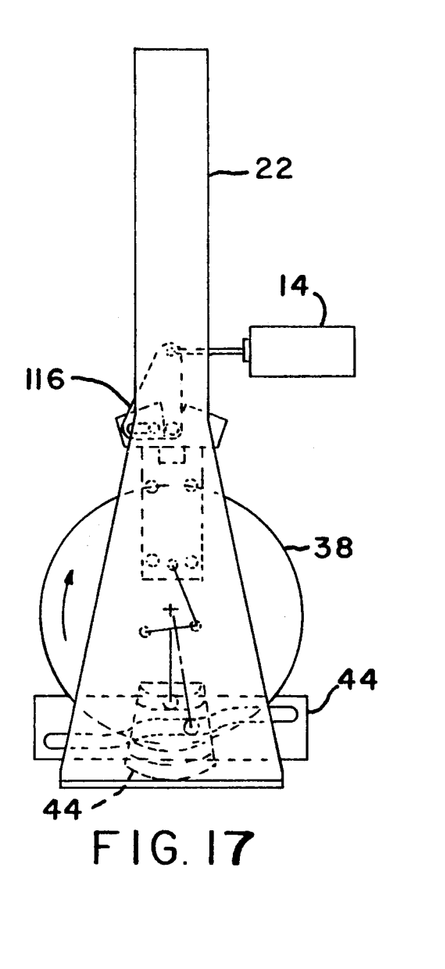

Section 152 has a smooth radius of curvature equal to the radial distance between the axis of drive member 40 and the axis of the wheel 38 so that when the member is at the top of the wheel and is moved through section 152, as illustrated in FIG. 8, the cam plate is not displaced vertically and plate 26 is dwelled in a steady, fixed vertical position. Likewise, the radius of curvature of section 154 is equal to the distance between the axis for member 40 and the axis of wheel 38 when the cam plate is at the bottom of the wheel and the member is moved through the section 154 as illustrated in FIG. 17. At this time, the cam plate and mounting plate 26 are maintained in a fixed lower position during label pick up.

The in-mold labeling apparatus is provided with a conventional vacuum system for supplying vacuum to the suction cups 112 as required in order to pick up labels from the magazines or label sources 14 and place the labels in the mold recesses 16.

OPERATION OF THE PREFERRED EMBODIMENT

The operation of in-mold labeling apparatus 10 will now be described with reference to FIGS. 10 through 19 of the drawings. These figures illustrate the sequence of operations of the apparatus through one revolution of continuously rotating wheel 38.

FIG. 10 illustrates the position of the in-mold labeling apparatus 10 after the vacuum cups 112 on label transport heads 110 have picked up labels 156 from magazines or sources 14, the arms 102 and heads 110 have been retracted and the retracted arms, heads cups and labels have been moved upwardly from the pick up position approximately one-half way to the labeling position. As illustrated, the drive member 40 is located in the left end of straight cam slot section 148 and the cam plate 46 is located away from the cam follower 52. Spring 90 holds the cam follower 52 in the lower position with slide 54 down in the position illustrated in FIG. 8 of the drawings.

Figure 11:
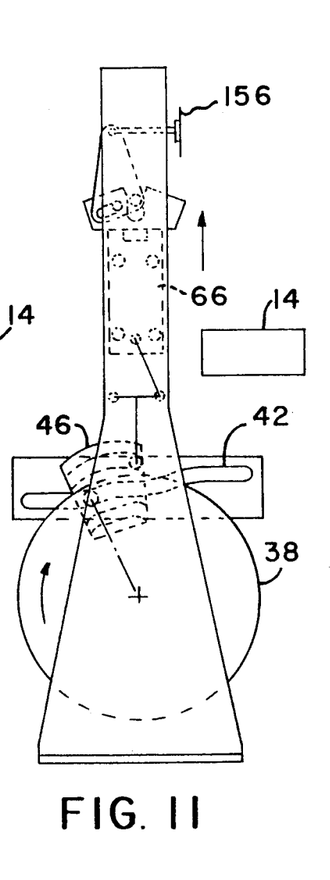

Further rotation of wheel 38 to the position of FIG. 11 raises the cam plate 44 and mounting plate 26 upwardly as drive member 40 is moved inwardly along the length of cam section 148 and into the beginning of the upwardly curved slot section 152. At the same time, rotation of wheel 38 moves the two slot cam plate 46 to position the lead-in portion of the outer slot 48 over the cam follower 52 a distance approximately equal to 5 degrees of rotation of wheel 38. There is a slight clearance between the follower 52 and the lead-in portion of the slot 48 so that follower is not lifted until the wheel rotates beyond the position of FIG. 11. The label transport assembly 24 and label carriages 28 have been fully elevated to position the label transfer heads 110 between the path of the mold halves 18. The transfer heads 110 and labels 156 remain in the retracted position.

Figure 12:
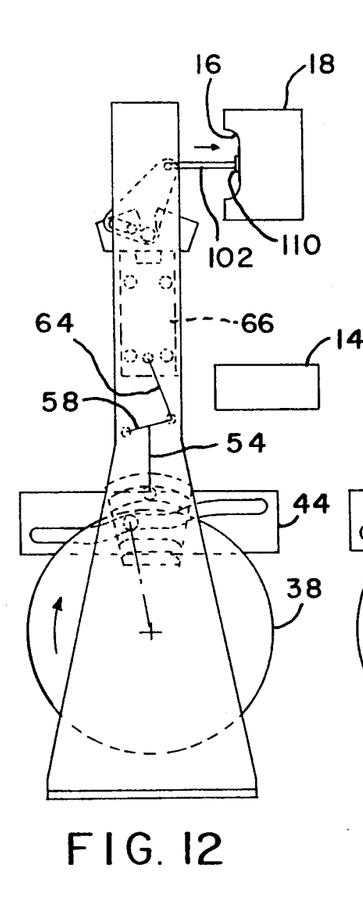
Figure 13:
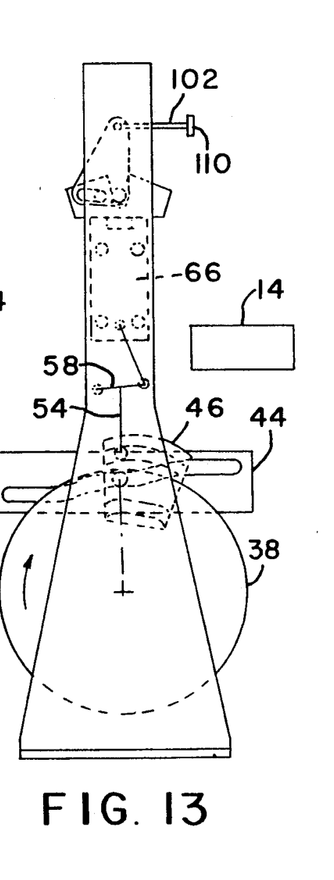

Further rotation of wheel 38 as shown in FIG. 12 rotates plate 46 to move follower 52 to the fully extended or upward position during a time when the drive member 40 is freely rotated through the outwardly curved section 152 of cam slot 42. During motion of the drive member through the portion 152, the label transport assembly 24 is maintained in a vertical dwell position as illustrated. At this time, movement of the follower 52 through slot 48 raises slide member 54 to fully elevate vertical plates 66 and 72, both port plates 132 and the drive units 130 on the plates. This vertical motion rotates the extension arms 116 to move the arms 102 and label transfer head 110 outwardly and place the labels 156 carried by the heads in the cavities 16 of the mold halves 18 as shown in FIG. 12. Extension of the arms 102 and heads 110 occurs during the dwell of the label transport assembly 24 at the label transfer position to assure that the heads 110 and labels are rapidly moved out directly into the bottoms of the mold cavities without vertical movement. In this way, the labels 156 are accurately placed in the bottoms of the moving mold halves as the mold halves rotate past the in-mold labeling assembly. After the labels have been seated in the mold halves, the vacuum applied to cups 112 is shut off and the labels are picked up by vacuum manifolds in the mold cavities.

Following the placement of the four labels into the four mold cavities, continued rotation of wheel 38 and plate 46 moves follower 52 into the downward portion of cam slot 48 to initiate retraction of the arms 102 and heads 110 from the mold cavities. At this time, the label transport assembly 24 is dwelled in the elevated label transfer position.

Figure 14:
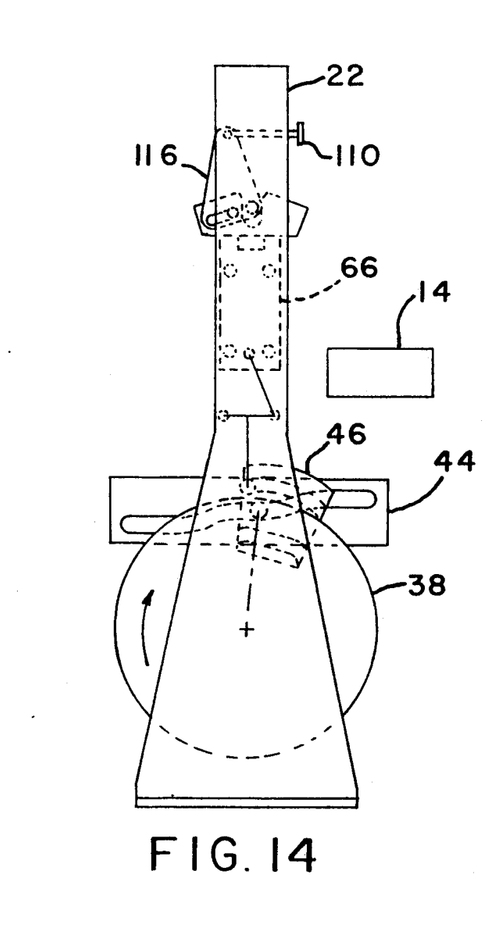
Figure 15:
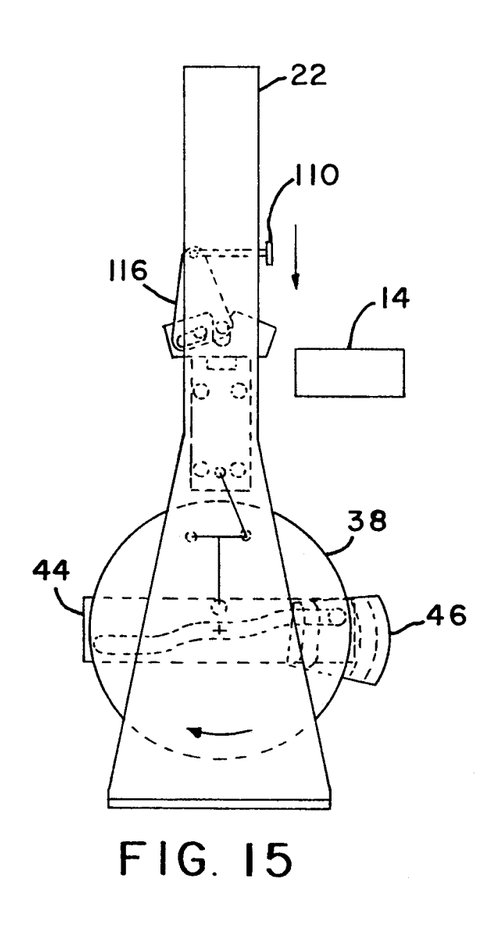

Further movement of wheel 38 as shown in FIG. 14 moves the cam follower 52 to the full lowered position to fully retract the arms 102 and heads 110 while at the same time moving the drive member 40 into the downwardly curved section 154 of cam slot 42. As the wheel moves the drive member through this section of the slot, the label transfer assembly and label carriers are accelerated rapidly down from between the mold halves. The down-ward movement of the label transfer assembly and label carriages continues as the drive member 40 is moved through and to the left end of the straight end section 150 of slot 42 as shown in FIG. 15.

Figure 16:
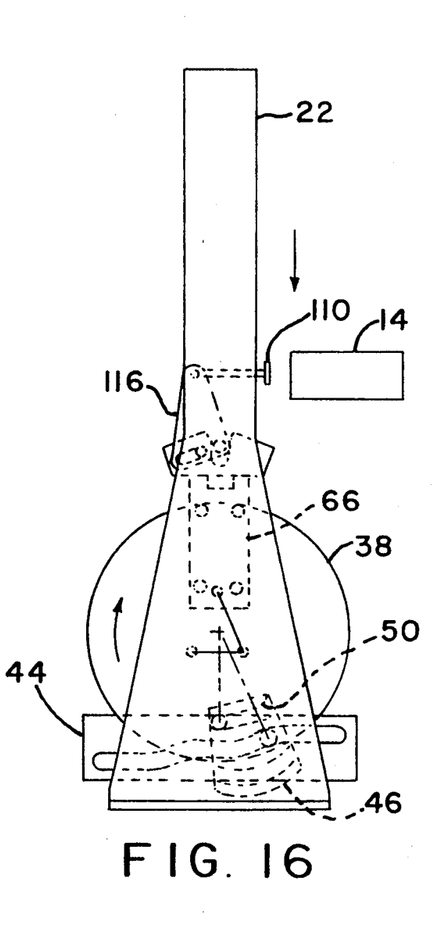

FIG. 16 illustrates the position of the in-mold labeling apparatus following further rotation of wheel 38 and movement of the drive member 40 back to the left and partially into the downwardly curved section 154 of slot 42. At this position the label transport assembly and label carriages are fully lowered at the pick up position and cam follower 52 is positioned in the lead portion of the inner cam slot 50 in plate 46.

Figure 18:
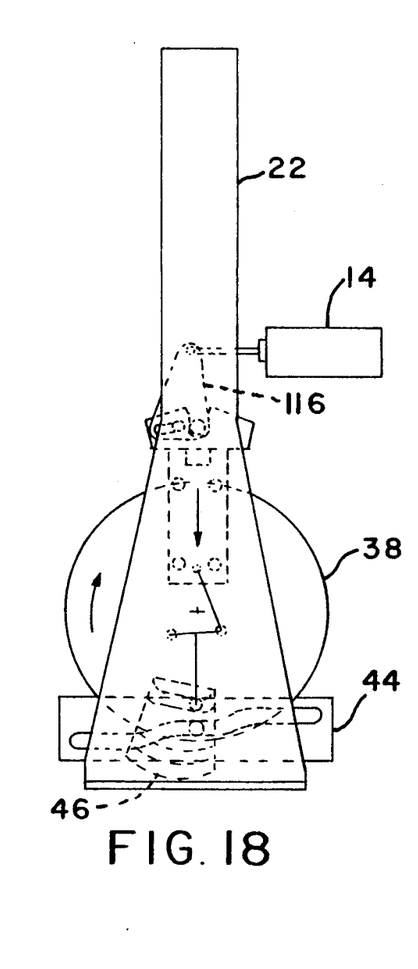

Further rotation of the wheel moves the drive member through slot portion 154 and dwells the assembly 24 the lower pick up position. Such rotation shown in FIG. 17, moves cam follower 52 through slot 50 to once more raise slide 54 and extend the label transfer arms 102 and heads 110 outwardly to move the vacuum cups 112 into engagement with the lead labels of magazines 14 or labels presented by label source 14, as the case may be. The vacuum system is actuated to supply vacuum to the heads 112 to assure a vacuum connection with the labels for proper pick up during the dwell period as shown in FIGS. 17 and 18 while the arms 102 and heads 110 are maintained in an extended position with the vacuum cups engaging the labels.

The arms 102 and heads 110 extend a further distance during transfer of labels to the mold halves 18 when in the upper or label transfer positions than when in the retracted position during label pick up. In this way, the time during which the vacuum cups engage the labels is increased to improve the vacuum connection between the cups and the labels.

Figure 19:
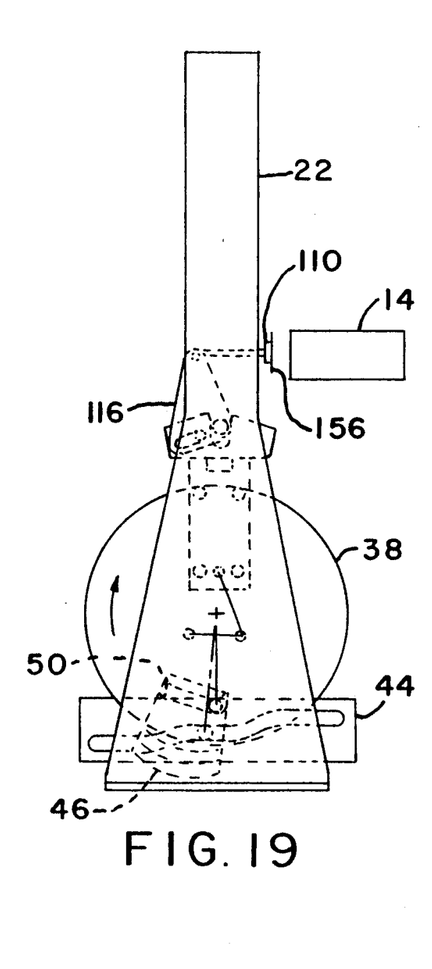

FIG. 19 illustrates the in-mold labeling apparatus after wheel 38 is rotated sufficiently to move the follower 52 to the end of the slot to return the slide 54 to the full lower position thereby fully retracting the arms 102, heads 110 and labels 156. At this position, the drive member 40 has reached the end of the dwell during movement through slot portion 154. Further rotation of the wheel moves the drive member through the remainder of portion 152 and portion 148 to raise and return the label transfer assembly 24 and label carriages 28 to the position of FIG. 10, thereby completing the cycle of operation.

Slight widening of the ends of the slots 48 and 50 facilitate movement of the slots around the cam follower 52 to assure proper capture of the follower at the positions slightly before FIGS. 11 and 16. Spring 90 holds the slide member 54 and follower member 52 in the lower position to assure proper capture in the two slots as the plate 46 is rotated toward the cam follower.

While we have illustrated and described a preferred embodiment of our invention, it is understood that this is capable of modification, and we therefore do not wish to be limited to the precise details set forth, but desire to avail ourselves of such changes and alterations as fall within the purview of the following claims.

What we claim as our invention is:

1. An in-mold labeling apparatus comprising:
   a) a label transport assembly movable between a label pick up position and a labeling position, the assembly having:
      i) a first label transfer head, and
      ii) a first label pick up means on the head;
   b) a rotary drive shaft;
   c) a rotary drive connecting the drive shaft and the label transport assembly for moving the label transport assembly between said positions; and
   d) a drive assembly independent of the rotary drive for moving the label transfer head between retracted and extended positions, said drive assembly including a movable first element and a movable second element,
      i) the first element being located in the path of the second element for movement by the second element when the label transport assembly is at the label pick up portion and at the labeling position;
      ii) the second element being mounted on and rotatable with the drive shaft about a path and engageable with the first element to move the first element when the label transport assembly is at the label pick up position and at the labeling position, and
      iii) a drive connection joining the first element and the label transfer head for extending the label transfer head in response to movement of the first element by the second element.

2. An apparatus as in claim 1 wherein said rotary drive includes means for dwelling the movement of the label transport assembly at the label pick up and labeling positions.

3. An apparatus as in claim 1 wherein the rotary drive includes a drive member connected to and rotatable by the drive shaft, and a cam plate on the label transport assembly having a cam slot extending generally transversely to the movement of the assembly, said drive member being positioned within the cam slot.

4. An apparatus as in claim 3 wherein the cam slot include straight end sections, one located above the other, and an S-shaped section joining the end sections.

5. An apparatus as in claim 4 wherein the S-shaped section includes two oppositely curved portions each having a radius of curvature equal to the radius of the drive member.

6. An apparatus as in claim 3 wherein the label transport assembly includes a main plate, said first label transfer head and first label pick up means being mounted on one side of one end of the main plate and the cam plate being mounted on the main plate, a second label transfer head and a second label pick up means mounted on the other side of the one end of the main plate, and a part of said drive connection crosses the main plate for extending the second label transfer head.

7. An apparatus as in claim 6 wherein said drive connection includes first and second members each movably mounted on opposite sides of said main plate, said part comprises a first connection between said members extending across the plate, second connections between said members and said first and second transfer heads and a third connection between one of said members and the first element.

8. An apparatus as in claim 7 including an opening in the main plate and wherein said first connection extends through the opening in said main plate.

9. An apparatus as in claim 1 wherein one of said first and second elements includes a cam surface and the other of said first and second elements includes a member movable along the cam surface.

10. An apparatus as in claim 1 wherein one of said first and second elements includes two cam surfaces and the other of said first and second elements includes a member movable along one of said surfaces when the label transport assembly is at the pick up position and movable along the other of said surfaces when the label transport assembly is at the labeling position.

11. An apparatus as in claim 10 wherein the path of the second element has a radius of curvature and one surface has a curvature greater than said radius of curvature and the other of said surfaces has a curvature less than said radius of curvature.

12. An apparatus as in claim 11 wherein the second element comprises a plate mounted on the drive shaft, said cam surfaces being formed in the plate and facing the first element.

13. An apparatus as in claim 12 wherein the first element comprises a follower mounted on the label transport assembly.

14. An in-mold labeling apparatus comprising:
a) a rotary drive shaft;
b) a label transport assembly including
 i) a label transfer head;
 ii) a label pick up means on the head; and
c) a drive connection joining the rotary shaft and the label transport assembly for moving the assembly along a path between label pick up and labeling positions including
 i) a drive member connected to and rotatable by the rotary shaft;
 ii) a cam plate connected to the label transport assembly having a cam slot extending generally transversely to said path, said slot including straight end sections, one located above the other and an S-shaped section joining the end sections, said drive member being positioned within the cam slot.

15. Apparatus as in claim 14 wherein the S-shaped section includes two oppositely curved portions, each having a radius of curvature equal to the radius of the drive member.

16. Apparatus as in claim 14 including a drive independent of the rotary drive for moving the label transfer head between extended and retracted positions.

17. Apparatus as in claim 16 wherein said drive extends the label transfer head when the drive member is located in one of the curved portions of the S-shaped section.

18. Apparatus as in claim 17 wherein the drive includes a cam plate mounted o the drive shaft for rotation with the shaft and having cam surface means, and a follower member mounted on the label transport assembly engageable with said cam surface means.

19. Apparatus as in claim 18 wherein said cam surface means comprises a pair of separate radially spaced cam surfaces each engageable with the follower member when the label transport assembly is at either the label pick up position or the labeling position.

20. Apparatus as in claim 19 wherein the shapes of the cam surfaces are different.

21. An in-mold labeling apparatus comprising:
a) a label transport assembly including
 i) a label transfer head; and
 ii) a label pick up means on the label transport head; and
b) an assembly drive for moving the label transport assembly between a label pick up position and a labeling position;
c) a rotary drive shaft;
d) a rotary drive independent of the assembly drive connection the drive shaft and the label transport head for extending and retracting the label transport head, the rotary drive including
 i) first drive connection means extending between the rotary drive shaft and the label transport head engageable only when the label transport assembly is in the label pick up position for extending the label transport head a first distance and then retracting the label transport head to pick up a label from a magazine or source of labels, and
 ii) second drive connection means extending between the rotary drive shaft and the label transport head engageable only when the label transport assembly is in the labeling position for extending the label transport head a second distance and then retracting the label transport head to place a label carried by the pick up means in a mold half.

22. Apparatus as in claim 21 wherein said first and second distances are different.

23. An apparatus as in claim 21 wherein said first connection means includes a drive member and a cam plate defining a cam surface one of said member and plate being fixed and the other of said member and plate being rotatably mounted on the drive shaft for movement past said one of said member and plate, and said second connection means includes said drive member and a second cam surface on said plate.

24. Apparatus as in claim 23 wherein said cam surfaces have different shapes.

25. Apparatus as in claim 21 wherein said cam plate is mounted on and rotates with the drive shaft.

26. The method of placing labels in molds of a blow molding machine using an in-mold labeling apparatus comprising the steps of:
a) continuously rotating a drive shaft,
b) repetitively moving a label transport assembly between a label pick up position and a labeling position through a first drive connection independent of the second drive member by repetitively moving a first drive member mounted on the drive shaft into and out of engagement with a first follower on the assembly;
c) repetitively moving a label transfer head on the label transport assembly between extended and retracted positions when the assembly is at the label pick up position and at the labeling position through a second drive connection between the shaft and the label transfer head independent of the first connection by repetitively moving a second drive member mounted on the drive shaft into and out of engagement with a second follower on the label transport assembly.

27. The method of claim 26 including the steps of dwelling motion of the label transport assembly at the label pick up position and at the labeling position and extending and retracting the label transfer head during dwelling of the label transport assembly.

28. The method of claim 26 including the steps of extending the label transfer head a first distance when at the label pick up position and a different distance when at the labeling position.

* * * * *

UNITED STATES PATENT AND TRADEMARK OFFICE
CERTIFICATE OF CORRECTION

PATENT NO. : 5,121,913
DATED : June 16, 1992  Page 1 of 2
INVENTOR(S) : Paul W. Klinedinst, Sr. et al It is certified that error appears in the above-indentified patent and that said Letters Patent is hereby corrected as shown below:

In the Abstract:

Line 2, change "carriage", to --carriages--.

Column 1, line 63, after "label pick", change "u" to --up--.

Column 3, line 45, after "circumferential", delete --the--.

Column 4, line 1, after "arm 58", delete --and--.

UNITED STATES PATENT AND TRADEMARK OFFICE
CERTIFICATE OF CORRECTION

PATENT NO. : 5,121,913
DATED : June 16, 1992
INVENTOR(S) : Paul W. Klinedinst, Sr. et al It is certified that error appears in the above-indentified patent and that said Letters Patent is hereby corrected as shown below:

Column 5, line 14, change "stroke", to --strokes--.

Column 6, line 13, after "heads", insert a comma.

In the Claims:

Claim 4, line 2, change "include", to --includes--.

Claim 18, line 2, change "mounted o the", to --mounted on the--.

Claim 21, line 11, change "connection" to --connecting--.

Claim 23, line 3, after "surface", insert a comma.

Signed and Sealed this

Fourteenth Day of September, 1993

Attest:

BRUCE LEHMAN

Attesting Officer    Commissioner of Patents and Trademarks